United States Patent [19]
Nixon

[11] 4,214,863
[45] Jul. 29, 1980

[54] ROTARY PAN PELLETIZERS

[75] Inventor: John S. Nixon, Appley Bridge, Near Wigan, England

[73] Assignee: Pilkington Brothers Limited, St. Helens, England

[21] Appl. No.: 33,072

[22] Filed: Apr. 25, 1979

[30] Foreign Application Priority Data

Apr. 27, 1978 [GB] United Kingdom ............... 16812/78

[51] Int. Cl.² .............................................. B29B 1/03
[52] U.S. Cl. .................................... 425/222; 425/256
[58] Field of Search ................................. 425/222, 256

[56] References Cited

U.S. PATENT DOCUMENTS

| | | | |
|---|---|---|---|
| 3,110,572 | 11/1963 | Reppert | 425/222 X |
| 3,335,456 | 8/1967 | Oya et al. | 425/222 |
| 3,345,683 | 10/1967 | Eirich et al. | 425/222 |
| 3,749,533 | 7/1973 | Lombardi | 425/222 X |
| 3,802,822 | 4/1974 | Harbison | 425/222 |
| 3,883,281 | 5/1975 | Halley | 425/222 |

*Primary Examiner*—J. Howard Flint, Jr.
*Attorney, Agent, or Firm*—Sughrue, Rothwell, Mion, Zinn and Macpeak

[57] ABSTRACT

In a rotary pan pelletizer, a central circular portion of the bottom surface of the pan is raised above the level of the annular portion around this central portion, and a stationary central plough is disposed with its lower surface in close proximity to the raised central portion. Binder liquid is fed on to the raised central portion and in operation the central plough keeps the raised central portion substantially clear of build-up of the material to be pelletized, so reducing formation of lumps and stabilizing operation. Further ploughs or scrapers are disposed over the annular portion to maintain a constant level of build-up of material thereon, at substantially the same depth as the height of the raised central portion.

5 Claims, 4 Drawing Figures

ROTARY PAN PELLETIZERS

BACKGROUND OF THE INVENTION

1. Field of the Invention

This invention relates to rotary pan pelletizers, which are used to convert a powdered or finely divided material, such as a batch of glass-making ingredients, into dust-free pellets.

2. Description of the Prior Art

Known pelletizers of this kind comprise a circular pan with a circumferential rim, mounted for rotation about an inclined axis. A plurality of stationary ploughs and/or oscillating scrapers are usually disposed at different radial distances from the axis and with their lower surfaces immediately above the bottom surface of the pan. The powdered or finely divided material, either dry or pre-wetted, is delivered into the rotating pan and sprayed with a liquid. In the case of a glass-making batch, the liquid may be water and/or an aqueous solution of a binder, such as caustic soda, which may provide a part or the whole of the $Na_2O$ content of the batch. As the pan rotates, the material forms nuclei which agglomerate and are compacted into pellets as they are rolled around the pan in well-defined streams, until the pellets have achieved the desired size, when they pass out over the rim and are collected for use.

It is normal practice to dispose the ploughs or scrapers so as to permit a bed of the material, e.g. from 5 to 20 mm thick, to build up on the bottom surface of the pan as a result of the impingement of the material and aqueous liquid on the surface. The ploughs or scrapers, apart from helping to define the streams of pellets, scrape the bed smooth so that the pellets can roll and agglomerate on it in the desired controlled manner. The bed also protects the bottom surface of the pan from wear. If the bed builds up to an excessive thickness, however, a considerable amount of the material will be scraped off it by the ploughs or scrapers in the form of lumps. This lumpy material, particularly when scraped off by the plough nearest to the pan axis, can be out of specification for size, composition and strength, as it has not passed through the normal cycle of nucleation, agglomeration and compaction, and can cause instability in the running of the pelletizer.

SUMMARY OF THE INVENTION

According to the present invention, a rotary pan pelletizer comprises a circular pan with a circumferential rim, mounted for rotation about an inclined axis, means for feeding material to be pelletized into the pan, and means for feeding a binder liquid on to a central area of the bottom surface of the pan, wherein the bottom surface of the pan is provided with a central circular portion which is raised above the level of the annular portion outside the said central portion and which extends radially substantially as far from the pan axis as the area on to which the binder liquid can be fed, and the pelletizer also comprises a stationary central plough disposed so as to operate over the whole area of the raised central portion of the bottom surface of the pan, with the lower surface of the central plough in close proximity to the raised central portion, and one or more further ploughs or scrapers disposed so as to operate over the whole area of the annular portion around the said central portion and having their lower surfaces in substantially the same plane as that of the central plough.

With this arrangement, the raised central portion of the bottom surface of the pan is kept substantially clear of accumulated material by the action of the liquid feed and the central plough immediately above it, so that the formation of lumps is greatly reduced, and the pelletizer runs in a stable manner. Tha annular outer area fills with the material to be pelletized, to form a bed of substantially the same depth as the central raised area, so that the whole surface of the pan on which the pellets are formed and rolled is in effect substantially smooth and flat, being formed in part by the clean surface of the central area and in part by the bed of material to be pelletized.

Preferably the raised central portion of the bottom surface of the pan is formed by the upper surface of a circular plate secured to the bottom of the pan. The plate can serve as a wear plate, which takes any wear due to running in close proximity to the plough, and which can be replaced when necessary without requiring replacement of the whole pan. The raised central portion may be substantially 20 mm above the level of the outer area, and its diameter may be substantially ⅔ of the diameter of the pan.

The lower surface of the central plough may lie at a height of 6 to 12 mm above the raised central portion of the bottom surface of the pan.

DETAILED DESCRIPTION OF THE INVENTION

Figure 1:
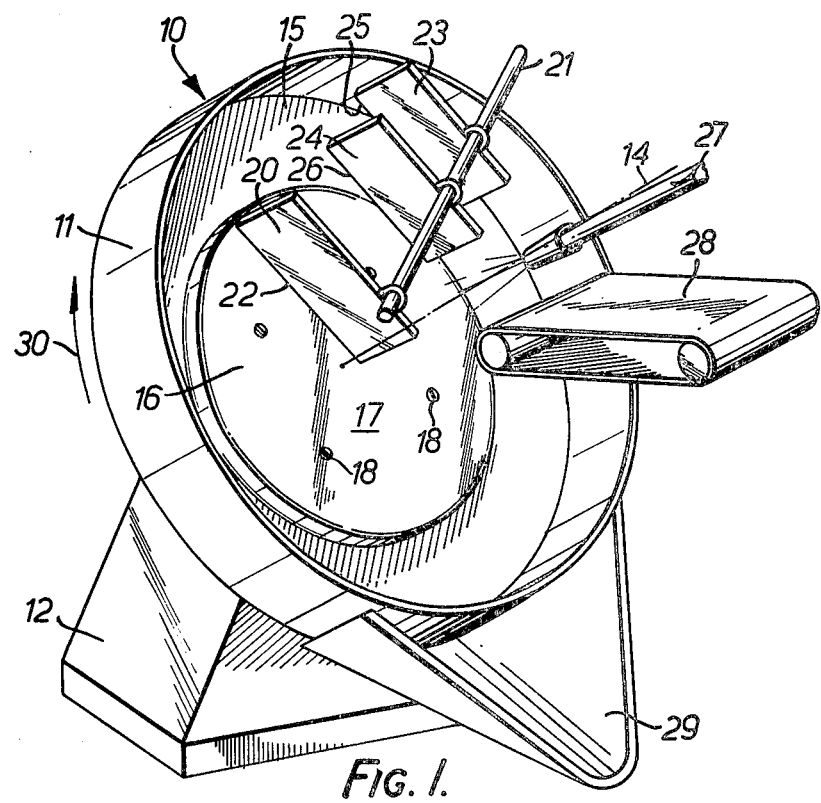
FIG. 1 is a perspective view of a rotary pan pelletizer.

In the apparatus illustrated, a circular pan 10 with a circumferential rim 11 is mounted on a base 12 for rotation about an axis 14 inclined to the horizontal at an angle of between 40° and 60°, preferably between 45° and 50°. The bottom surface of the pan 10 comprises a flat annular outer portion 15 and a central portion 16 raised above the level of the annular outer portion. The raised central portion 16 is formed by the upper surface of a circular wear plate 17 secured to the bottom of the pan 10 by countersunk screws 18. The plate 17 may be, for example, 20 mm thick and its diameter may be substantially ⅔ of the diameter of the pan 10, being for example 60 cm in diameter for a pan of 98 cm diameter.

A stationary plough 20 is supported from a bar 21 at an angle to the pan radius and with its lower surface 22 in close proximity to the raised central portion 16. The clearance between the plough 20 and the raised portion 16 is insufficient to permit a fully formed pellet to pass between them, but sufficient for the small fragments which form nuclei on which pellets grow. At least one further plough, and as shown two ploughs 23 and 24, is or are provided over the annular outer area 15, supported from the bar 21. These further ploughs 23, 24, have their lower surfaces 25, 26, in the same plane as the lower surface 22 of the central plough 20. Between them, the ploughs 20, 23, 24, operate over the whole area of the bottom of the pan during its rotation. In the example illustrated, the ploughs are parallel to one another, but this is not always the case. The number, spacing and distribution of the ploughs can be varied in known manner so as to control the flows of material and to allow the normal stream pattern to develop on the pan during its rotation. A single plough 20 is normally used to operate over the central raised portion 16, and radial overlap between ploughs is kept to a minimum.

A nozzle 27 is provided for spraying an aqueous liquid on to a central area of the bottom of the pan 10 during operation, to act as a binder. This central area is substantially wholly within the raised central portion 16, though it may extend radially from the pan axis 14 as far as the edge of the raised portion. The material to be pelletized is supplied into the pan 10 by a conveyor indicated diagrammatically at 28. A chute 29 is provided to receive pellets from the pan 10 and to direct them to collecting means (not shown).

In use, aqueous liquid is first sprayed into the pan 10 from nozzle 27, and the powdered or finely divided material is supplied by conveyor 28 to the pan. In the case of a glass-making batch, the material will normally be finely powdered and would be difficult to handle, particularly for feeding to a glass making furnace, because of the difficulty of avoiding loss of fine powders in a draughty environment. For a soda-containing glass, the aqueous liquid can advantageously be a concentrated caustic soda solution providing a part or the whole of the $Na_2O$ content of the glass.

The pan 10 is rotated in the clockwise direction as indicated by arrow 30. At least the central area of the raised portion 16 of the bottom surface of the pan is initially wetted by the caustic soda solution, and the batch material then tends to build up on it, but the central plough 20, with the spray of liquid from nozzle 27, prevents any substantial build-up and transfers the material to the annular outer portion 15 where it can build up a bed some 20 mm deep under the outer ploughs 23, 24. At the same time, the batch material forms nuclei which are agglomerated and compacted in known manner as they roll around the smooth, flat surface which is provided over the whole area of the pan, by the bed formed on the outer annular portion 15 and by the raised central portion 16 of the bottom of the pan. The flow pattern of nuclei and pellets in the rotating pan is controlled by the ploughs 20, 23, 24 in known manner. Because the central portion 16 of the bottom of the pan is kept substantially free from build-up of batch material, formation of lumps is greatly reduced and the pelletizer runs in a stable manner.

The size of the pellets formed can be controlled by variation of the height of the lower surface 22 of the centre plough 20 above the central portion 16 of the bottom surface of the pan, as indicated in the following Table:

| Height of centre plough 20 above central portion 16 | Pellet size - % in range | | | |
| --- | --- | --- | --- | --- |
| | 6–9 mm | 9–12 mm | 12–15 mm | over 15 mm |
| 6 mm | 10 | 90 | | |
| 9 mm | | 45 | 55 | |
| 12 mm | | 5 | 95 | |
| 15 mm | | | 5 | 95 |

With the plough 20 at a height of 15 mm above the central portion 16, however, it is found that instability of operation begins to be experienced, so it is preferred to use heights of 6 to 12 mm.

The wear plate 17, carrying the raised central portion 16, may be of steel or other wear-resistant material. It takes any wear arising from the close proximity of the stationary plough 20 to the rotating pan surface, and it can be replaced when necessary. In some circumstances, however, it may be preferred to form the raised central portion 16 on an integral raised portion 31 of the bottom of the pan 10, as shown in FIG. 3.

Figure 2:
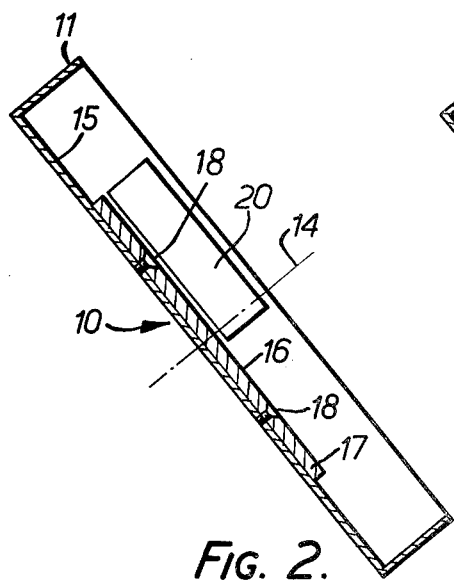
FIG. 2 is a cross-section through the pan.
Figure 3:
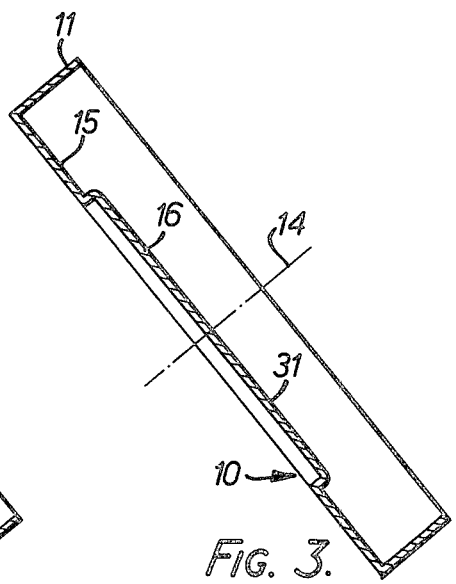
FIG. 3 is a cross-section through an alternative form of pan.
Figure 4:
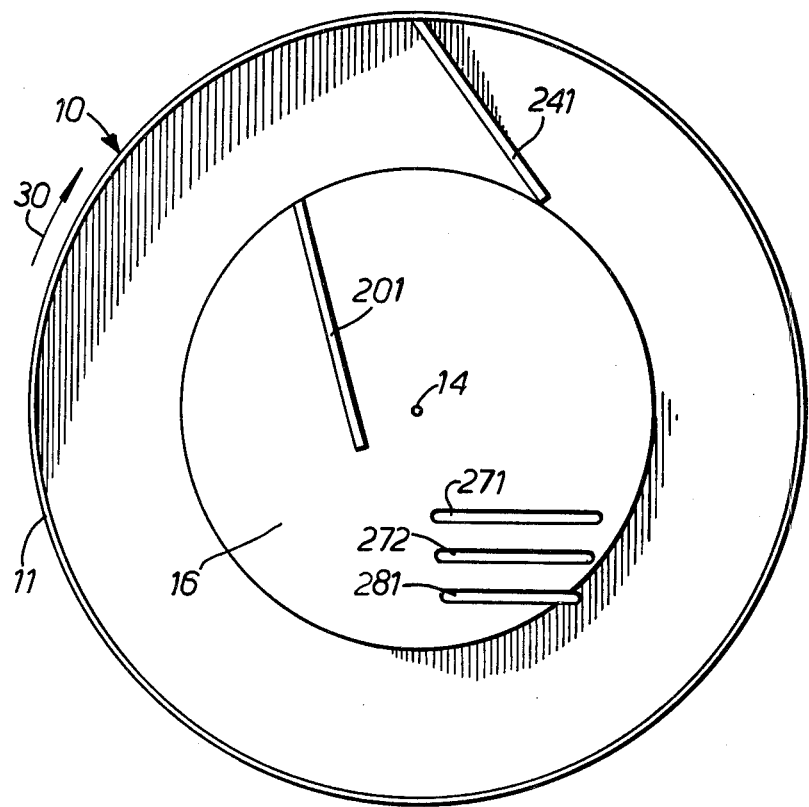
FIG. 4 is a plan view of the pan, showing a modified arrangement of ploughs and liquid feeding means.

FIG. 4 illustrates a modified arrangement, in which the pan 10 with its raised central portion 16 is as shown in FIGS. 1 and 2 or FIG. 3, but in which only two ploughs are employed. The centre plough 201 is here disposed wholly to the left of pan axis 14, whereas in FIG. 1 centre plough 20 extends to the right of the axis 14. The outer plough 241 in FIG. 4 is not parallel to the centre plough 20; it extends from the rim 11 up to or just over the edge of the raised central portion 16, so that as before the ploughs operate between them over the whole area of the pan during its rotation. The precise disposition of the ploughs in any particular case depends on the inclination of the pan axis to the horizontal. The liquid feeding means is shown in FIG. 4 as comprising two elongated nozzles 271, 272, which can be used to feed water and caustic soda solution separately on to the central area of the pan in cases where this may be necessary. FIG. 4 also shows an elongated feeding means 281 for feeding the dry powdered material which is to be pelletized into the pan 10.

While the use of a central plough over the central raised portion 16 of the bottom surface of the pan is essential, other forms of scrapers, such as rotary scrapers, may be used over the annular outer portion 15 to keep the bed of material to substantially the same depth as the raised portion 16.

We claim:

1. A rotary pan pelletizer comprising a circular pan with a circumferential rim, mounted for rotation about an inclined axis, means for feeding material to be pelletized into the pan, and means for feeding a binder liquid on to a central area of the bottom surface of the pan, wherein the bottom surface of the pan is provided with a central circular portion which is raised above the level of the annular portion around the said central portion and which extends radially substantially as far from the pan axis as the area on to which the binder liquid can be fed, and the pelletizer also comprises a stationary central plough disposed so as to operate over the whole area of the raised central portion of the bottom surface of the pan, with the lower surface of the central plough in close proximity to the raised central portion, and one or more further ploughs or scrapers disposed so as to operate over the whole area of the annular portion around the said central portion and having their lower surfaces in substantially the same plane as that of the central plough.

2. A pelletizer according to claim 1 wherein the raised central portion of the bottom surface of the pan is formed by the upper surface of a circular plate secured to the bottom of the pan.

3. A pelletizer according to claim 1 wherein the raised central portion is substantially 20 mm above the level of the outer area.

4. A pelletizer according to claim 1, wherein the diameter of the raised central portion is substantially ⅝ of the diameter of the pan.

5. A pelletizer according to claim 1, wherein the lower surface of the central plough lies at a height of 6 to 12 mm above the raised central portion of the bottom surface of the pan.

* * * * *